United States Patent [19]

Kaneko et al.

[11] Patent Number: 5,430,885
[45] Date of Patent: Jul. 4, 1995

[54] MULTI-PROCESSOR SYSTEM AND CO-PROCESSOR USED FOR THE SAME

[75] Inventors: Kenji Kaneko, Sagamihara; Hirotada Ueda, Kokubunji; Tetsuya Nakagawa, Koganei; Atsuchi Kiuchi, Kunitachi; Yoshimune Hagiwara, Hachioji; You Takamori, Kokubunji; Takanori Toyomasu, Fukuoka, all of Japan

[73] Assignees: Hitachi, Ltd.; Hitachi Maxell, Ltd.; Hitachi VLSI Engineering Corporation, all of Tokyo, Japan

[21] Appl. No.: 782,760

[22] Filed: Oct. 22, 1991

Related U.S. Application Data

[63] Continuation of Ser. No. 489,854, Mar. 2, 1990, abandoned, which is a continuation of Ser. No. 112,945, Oct. 27, 1987, abandoned.

[30] Foreign Application Priority Data

Oct. 30, 1986 [JP] Japan ................. 61-259375

[51] Int. Cl.⁶ ................. G06F 15/16; G06F 15/173; G06F 15/80

[52] U.S. Cl. .................. 395/800; 364/DIG. 1; 364/228.6; 364/229; 364/229.2; 364/230; 364/230.3; 364/230.4; 364/2131.9; 364/240; 364/240.1

[58] Field of Search ................. 364/200, 900

[56] References Cited

U.S. PATENT DOCUMENTS 3,979,728  9/1976  Reddaway .............. 364/200
4,809,169  2/1989  Sfarti et al. ............ 364/200

Primary Examiner—Paul V. Kulik
Attorney, Agent, or Firm—Antonelli, Terry, Stout & Kraus

[57] ABSTRACT

A multi-processor system for multidimensional image signal processing includes a plurality of co-processors and a host processor which issues processor numbers and a command to the co-processors through a bus. Due to the multi-dimensional nature of the processor numbers, data processing for given ranges of an image signal can be shared by the co-processors. A particular multi-dimensional processor number issued by the host computer which allows simultaneous communication to be performed between the host processor and the co-processors.

6 Claims, 20 Drawing Sheets

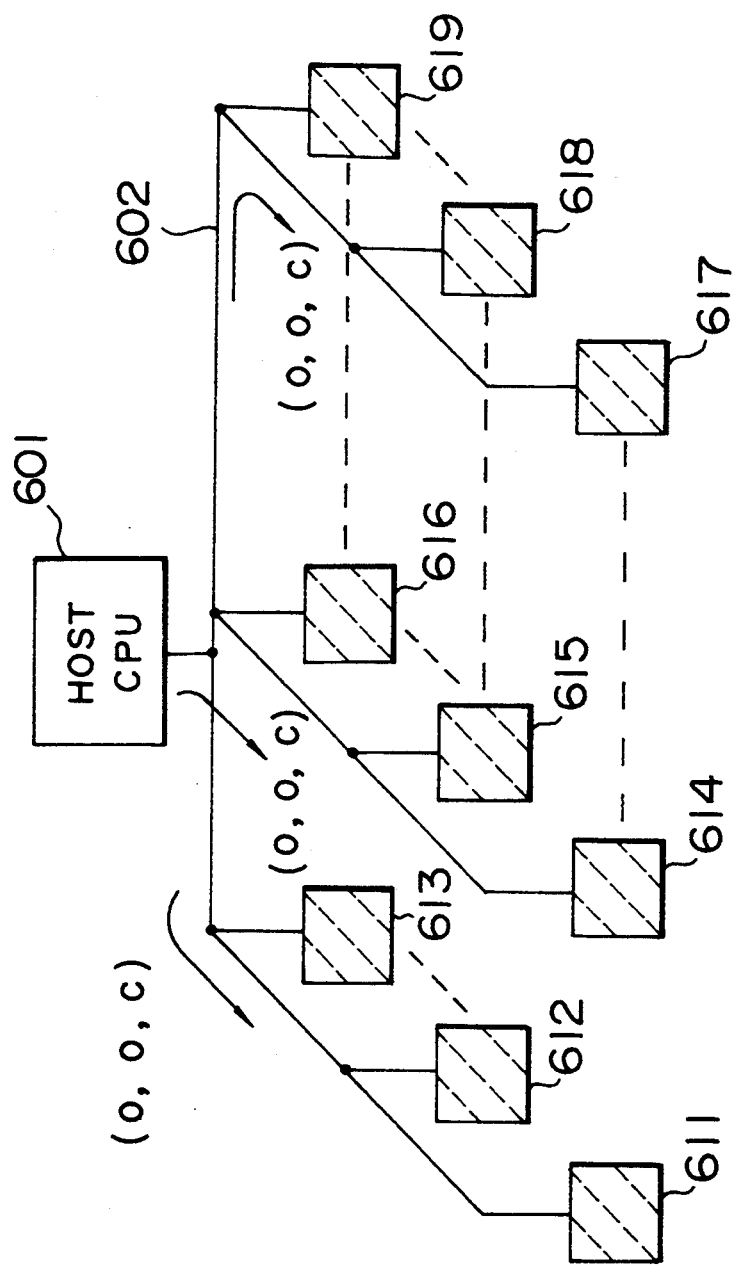

P ($i_1$, $j_1$, $i_2$, $j_2$)

P(0, 0, 1, 0)

P(0, 0, 1, 2)

P(0, 1, 1, 0)

P(1, 2, 1, 0)

P(1, 0, 2, 0)

MULTI-PROCESSOR SYSTEM AND CO-PROCESSOR USED FOR THE SAME

This application is a continuation of application Ser. No. 489,854, filed on Mar. 2, 1990, which is a continuation of Ser. No. 112,945, filed on Oct. 27, 1987, both abandoned.

BACKGROUND OF THE INVENTION

1. FIELD OF THE INVENTION

The present invention relates generally to a multi-processor system and a co-processor to be used for the same. More particularly, the invention is concerned with a high-speed data processing technique in which a plurality of processor elements or co-processors are employed for performing signal processing.

2. DESCRIPTION OF THE RELATED ART

For performing data processing with a multi-processor system, it is required to allocate processor (identification) numbers to a plurality of arrayed co-processors, respectively, in order to cause the co-processors to carry out respective tasks differing from one another or to allow communication to be carried out between the co-processors and a host computer.

As the means for allocating the processor numbers to processor elements, there can be mentioned, for example, a method disclosed in a Japanese publication "Nikkei Electronics" (Apr. 9, 1984), p. 206. According to this known method, each of the processor elements is equipped with an external buffer in which the relevant processor number is placed, wherein upon initialization of the system, a one-dimensional number is loaded in an internal register incorporated in each processor element from the associated buffer. More specifically, in the case of the multi-processor system mentioned above, a plurality of imaged pipelined processors are interconnected in a ring-like configuration. Each processor element is provided with a module number register of four bits, and sixteen different module numbers are employed in total. Interconnection between the processor elements can be accomplished simply by connecting an output bus of the processor element at a preceding stage to an input bus of a succeeding processor stage and additionally providing a four-bit register for holding the module number. The numerical value of the number placed in the buffer is inherent to the associated processor and is transferred in the associated processor at the time of initialization of the multi-processor system.

FIG. 2 of the accompanying drawings shows an array diagram of processor elements (also referred to as co-processor) which cooperate to constitute a multi-processor system which was developed and examined by the inventors on the way to the present invention.

Referring to FIG. 2, a plurality of co-processors 111 to 119 each constituting a data processing unit are interconnected in parallel in the form of a m×n array through a system bus 102 and placed under the control of a host processor 101. For convenience of description, it is assumed that two-dimensional image data processing is to be performed with this multi-processor system. In the two-dimensional image data processing, filtering operation and other are performed for M×N picture elements (pixels). Accordingly, the data involved in the operations amounts to an enormous volume. Assuming, by way of example, that the filtering operation is to be performed on 2,000×2,000 picture elements by resorting to a neighboring operation for every set of 3×3 picture elements, the number of times the data processing must be performed will amount to 36,000,000 (=2,000×2,000×3 ×3). Accordingly, when the data operations mentioned above are to be executed, it is preferred to use the multi-processor system of such a configuration as shown in FIG. 2, wherein data derived from a division of the M×N picture elements into a number of groups or sets are supplied, respectively, to the individual data processing elements or co-processors provided in a corresponding number, to thereby realize the simultaneous parallel operations by the co-processors. In this case, the time required for the data processing operation can be reduced to a small fraction when compared with the case where the operation is performed by the single data processing unit. In this conjunction, in order that the host processor 101 may have information about which of the processor elements or co-processors is to perform the data processing operation on which of the groups or sets of the picture elements resulting from the above-mentioned division, it is necessary that the co-processors (PE) 111 to 119 can be identified or designated discriminatively by attaching the identification numbers (referred to as the co-processor number of PE number) to the co-processors, respectively. In the approach made by the inventors in precedence to the present invention, the processor elements or PEs, that is, co-processors were labelled with serial integer numbers "1" to "mn", as illustrated in FIG. 2 in parentheses, respectively.

It should be mentioned here that when the data processing operations are to be performed uniformly over a whole region 301 of the M×N picture elements, as indicated by a hatched area in FIG. 3A of the accompanying drawings, sequential PE numbers may be attached one-dimensionally, since the PE numbers are, respectively, unique to the individual processor elements or co-processors. However, in the image signal processing, there often arises such a case where only a part of the region consisting of the M×N picture elements (i.e. sub-region) as indicated by hatched areas 302, 303 and 304 in FIGS. 3B, 3C and 3D, respectively, is required to be processed. In that case, with the one-dimensional PE number allocation mentioned above, the host processor 101 (FIG. 1) must communicate many times with the co-processors or PEs participating in the data processing on the region sharing basis in order to give instructions or commands to them. Consequently, burden imposed on the host computer is significantly increased. Besides, the quantity of communication made between the host processor and the PEs is increased, which in turn means that the burden imposed on the operating system is correspondingly increased, resulting in reduction not only in the throughput of the data processing but also in the processing speed in other operations, to great disadvantage.

By way of example, let's assume that same processing is to be performed for the partial image data area extending in the y-direction as shown in FIG. 3B. The procedure for the data processing adopted heretofore is usually as follows:

(a) The host processor is requested to transfer information such as parameters, program and others required for the processing to a plurality of co-processors or PEs which share the processing for a region to be processed. In that case, since the PE numbers are given one-dimensionally, the command for executing the information transfer must be issued as many times as the number of the processor elements participating in the processing. Consequently, a considerable amount of time will be consumed for transmission of the commands. Besides, since the host processor must constantly supervise or monitor the information transfer, the host processor is incapable of performing other tasks or jobs during the period in which the command or instruction transfer mentioned above takes place.

(b) In succession to the information transfer, the host processor has to command the individual processor elements or co-processors to execute the processing as allocated thereto. At this time, a time taken for issuing the commands as many as the number of the co-processors is consumed uselessly.

SUMMARY OF THE INVENTION

As will be appreciated from the review of the multi-processor system developed in precedence to the present invention, there are problems such as: (a) lack of flexibility in performing the image signal processing because of one-dimensional representation of the co-processor numbers, (b) no consideration is paid to the possibility of various modes of communication between the host computer and the individual co-processors, and others.

Accordingly, it is an object of the present invention to solve the problems mentioned above and provide a multi-processor system which is capable of processing data at a very high speed and which allows communications between a host processors and a plurality of co-processors to be simultaneously carried out.

In view of the above and other objects which will become more apparent as description proceeds, a typical one of the co-processors implementing the teaching of the invention disclosed herein includes a register for storing a multi-dimensional processor number presented previously by a host processor inherently to the above-mentioned co-processor, comparator means for comparing the inherent processor number stored in the register with a processor number transmitted from the host processor together with a command, and responsive means for accepting the command and making response when the aforementioned comparison effected by the comparator means results in coincidence or when the processor number issued by the host computer assumes a particular numerical value.

According to a preferred embodiment of the present invention, the following rules may be adopted in connection with allocation of the processor numbers to a plurality of co-processors.

(a) Multi-dimensional numbers are used for the processor numbers. By virtue of this feature, two-dimensional or three-dimensional data processing or the data processing for any given partial image area can be easily shared by the co-processors (processor elements) upon processing of the image signal.

(b) A particular numerical value exemplified by zero or other is used in conjunction with the processor number for the purpose of simultaneous communication with the host processor. This allows communications between the host processor and the plurality of co-processors to be conducted simultaneously.

(c) A plurality of formats are prepared for the processor number so that the format can be altered in response to a command from the host processor. Due to this arrangement, the image data to be processed can be allotted to the plurality of co-processors one-dimensionally or two-dimensionally upon image processing, whereby the desired or requisite processing mode can be imparted with an enhanced flexibility.

BRIEF DESCRIPTION OF THE DRAWINGS

FIGS. 5A and 5B are views showing, respectively, arrays of co-processors or PEs which permit a host processor to perform simultaneous communication with co-processors;

DESCRIPTION OF THE PREFERRED EMBODIMENTS

In the following, the present invention will be described in detail in conjunction with exemplary and preferred embodiments thereof by reference to the drawings.

Figure 1:
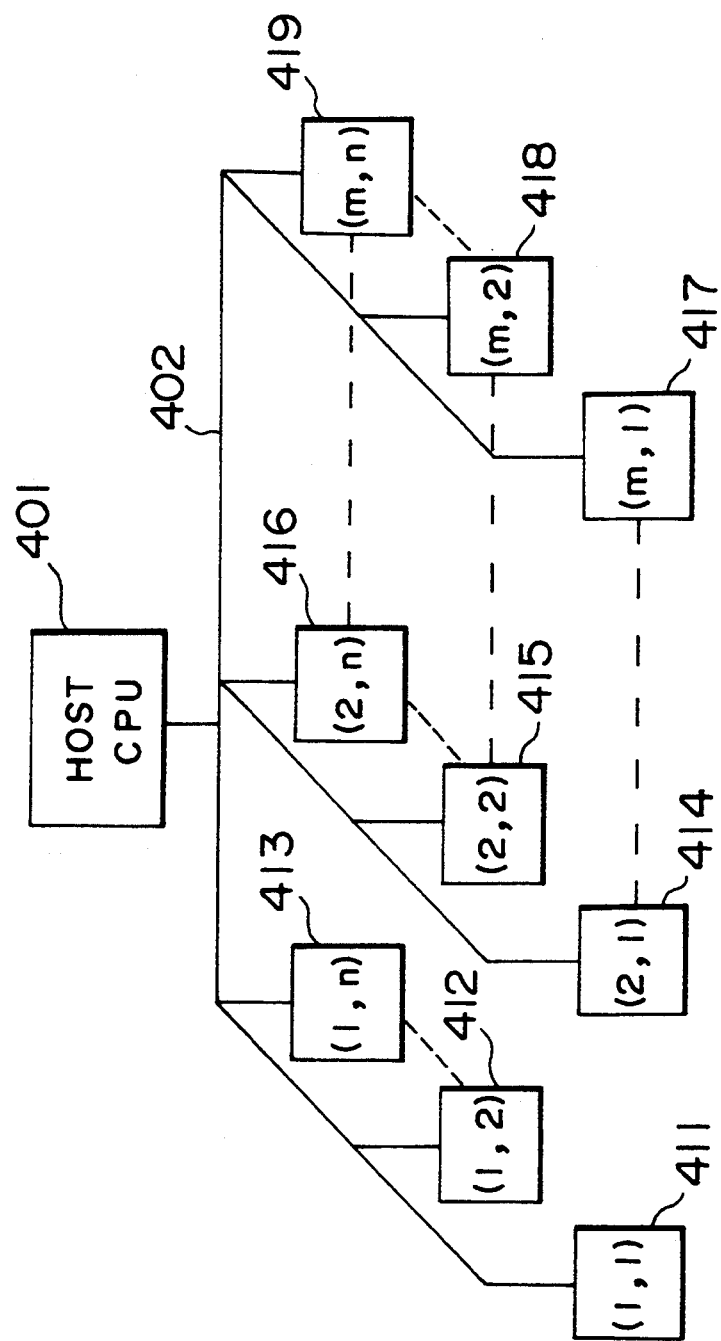
FIG. 1 is a view showing schematically a general arrangement of a multi-processor system according to an exemplary embodiment of the present invention.
Figure 2:
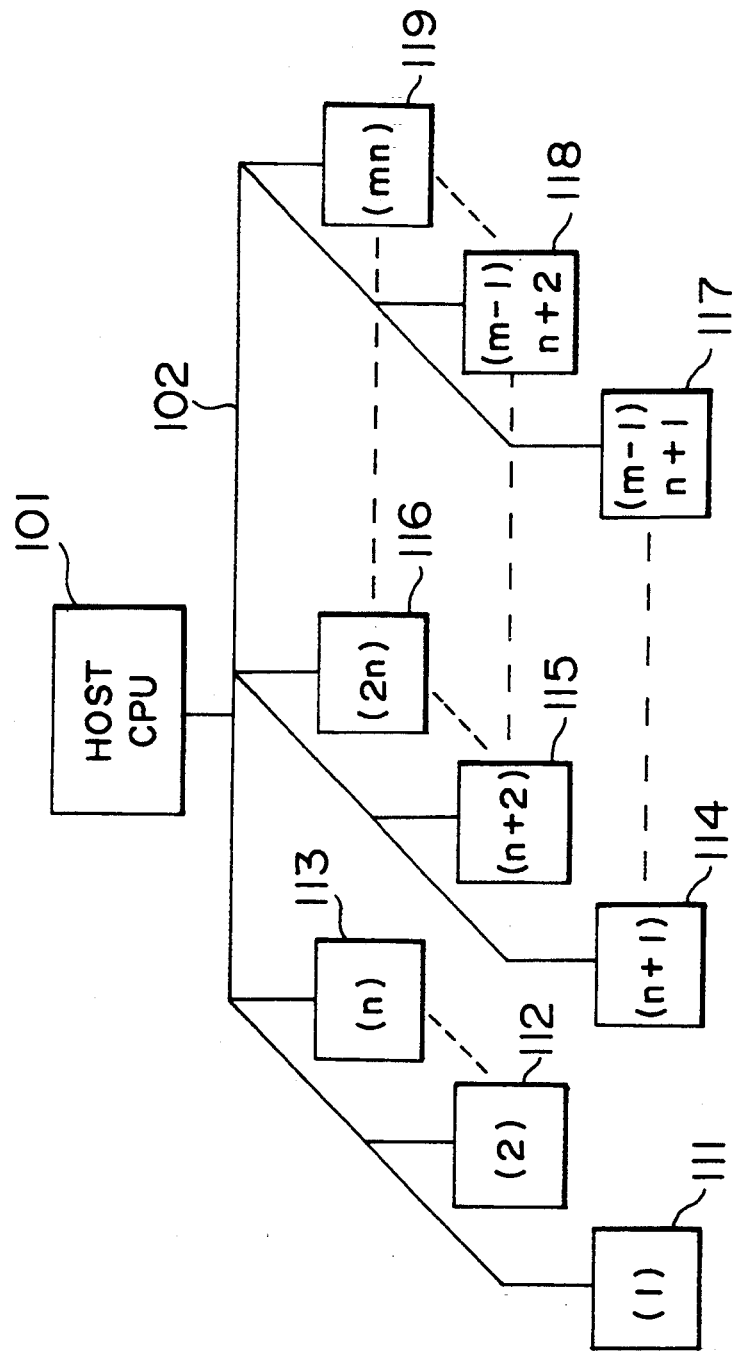
FIG. 2 is a view showing an arrangement of a multi-processor system developed for the purpose of study by the inventors in precedence to the present invention.

FIG. 1 shows schematically a layout of co-processors (also referred to as the processor elements or PE in abbreviation) in a multi-processor system according to a first embodiment of the invention.

Referring to FIG. 1, a host processor or CPU 401 can designate a plurality of co-processors 411 to 419 connected through a bus 402 with two-dimensional co-processor numbers (PE numbers) composed of two digits or values (1, 1) to (m, n), respectively.

Upon communication between the host processor 401 and the PEs 411 to 419, information each containing in a pair the two-dimensional PE number and the command issued by the host processor 401 is made use of.

Figure 4A:
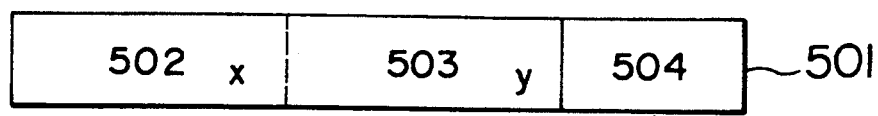
FIGS. 4A to 4C are views showing examples of format for the co-processor number (PE number) employed in the multi-processor system shown in FIG. 1.
Figure 4B:
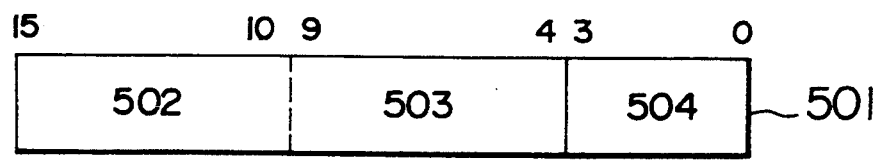
Figure 4C:
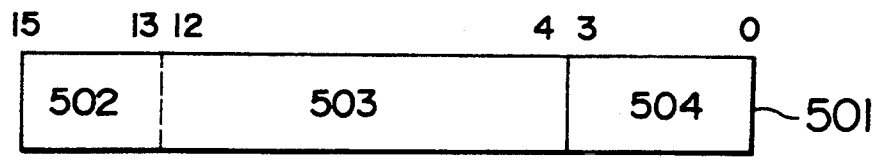

FIGS. 4A to 4C are views showing examples of the format for the PE number according to the invention. More specifically, FIG. 4A shows a format 501 for the information corresponding to a combination in pair of the two-dimensional PE numbers denoted by reference numerals 502 and 503 with a command 504. The two-dimensional PE numbers 502 and 503 represent the rowwise PE number (i.e. PE number in the x-direction) and the columnwise PE number (i.e. PE number in the y-direction), respectively.

The information mentioned above is determined in accordance with the bit width of the system bus 402. By way of example, in the case of a system bus of 16-bit width, four bits are allotted to the command with the remaining twelve bits being allotted to the PE numbers 502 and 503. In this conjunction, it is to be noted that six of the twelve bits may be allotted to the PE numbers in the x- and y-directions, respectively, as is illustrated in FIG. 4B, or alternatively different numbers of bits of the twelve bits, e.g. three bits and nine bits, may be allotted to the PE numbers in the x- and y-directions, respectively.

Under the circumstance, in the case of the illustrated embodiment, several different formats are prepared for the bit allotment to the PE numbers in the x- and y-directions, so that the PE number designation method can be correspondingly altered readily upon alteration of the set mode under the command of the host processor.

To this end, each co-processor or PE is provided with a mode setting register in which mode setting data can be written by the host processor. On the basis of the mode setting data, the aforementioned bit allotment to the PE numbers issued by the host processor is discriminated. With this arrangement, bit allotment to the PE numbers can be altered in a facilitated manner regardless of whether the numbers of picture elements (pixels) in the rowwise and columnwise directions are equal to each other or the number of the picture element in one direction is far greater than the number in the other direction, as exemplified by the one-dimensional row of the pixels in an extreme case.

According to the illustrated embodiment under consideration, it is taught that a specific numerical value be included in the PE number for realizing the global communication between the host processor and the co-processors in addition to the multi-dimensional number designation mentioned above. In this conjunction, it is assumed, by way of example only, that zero is to be used as the numerical value for the global communication. With such arrangement, execution of the data processing can be facilitated in the forms illustrated in FIGS. 3A, 3B and 3C, respectively.

Figure 5B:
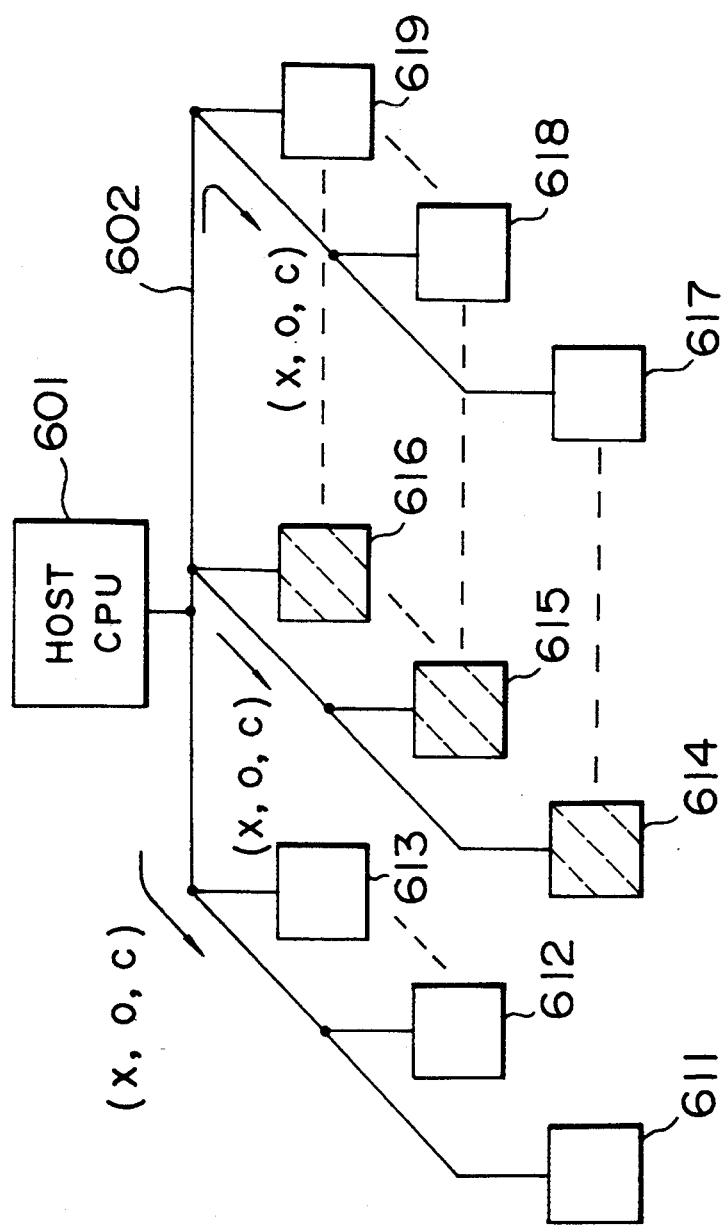

FIGS. 5A and 5B are views showing those of co-processors or PEs which can simultaneously communicate with the host processor or CPU.

Figure 3A:
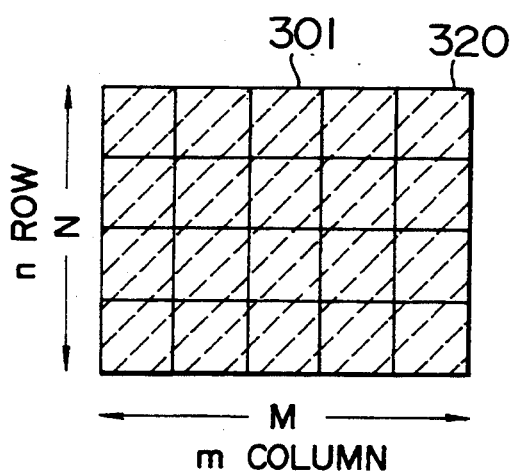
FIGS. 3A to 3D are views for illustrating operation modes of a plurality of processor elements (PEs)

Referring to FIG. 5A, when a PE number (0, 0) and a command C are issued in a pair by the host processor 601, all the co-processors (PE) 611 to 619 simultaneously take it that the command C is destined for them and make response to the host processor 601. This means that the command for executing the image processing over the whole region as shown in FIG. 3A may be issued only once by the host processor 601.

On the other hand, assuming that a PE number (x, 0) and a command C are issued in a pair by the host processor 601, all the co-processors 614 to 616 belonging to the x-th row respond thereto simultaneously, as illustrated in FIG. 5B, whereby the data processing in the direction rowwise can be easily effectuated. Similarly, the processing in the y-direction (i.e. in the direction columnwise) can be facilitated. It goes without saying that upon issuing of the PE number (x, y) having a particular value except for zero, only the corresponding one of the co-processors can respond thereto.

As will now be appreciated, the host processor or CPU is required to issue a command only once to a plurality of co-processors for the processing of same content of data, whereby the time involved in the communication between the host processor and the co-processors can be reduced significantly.

Figure 6:
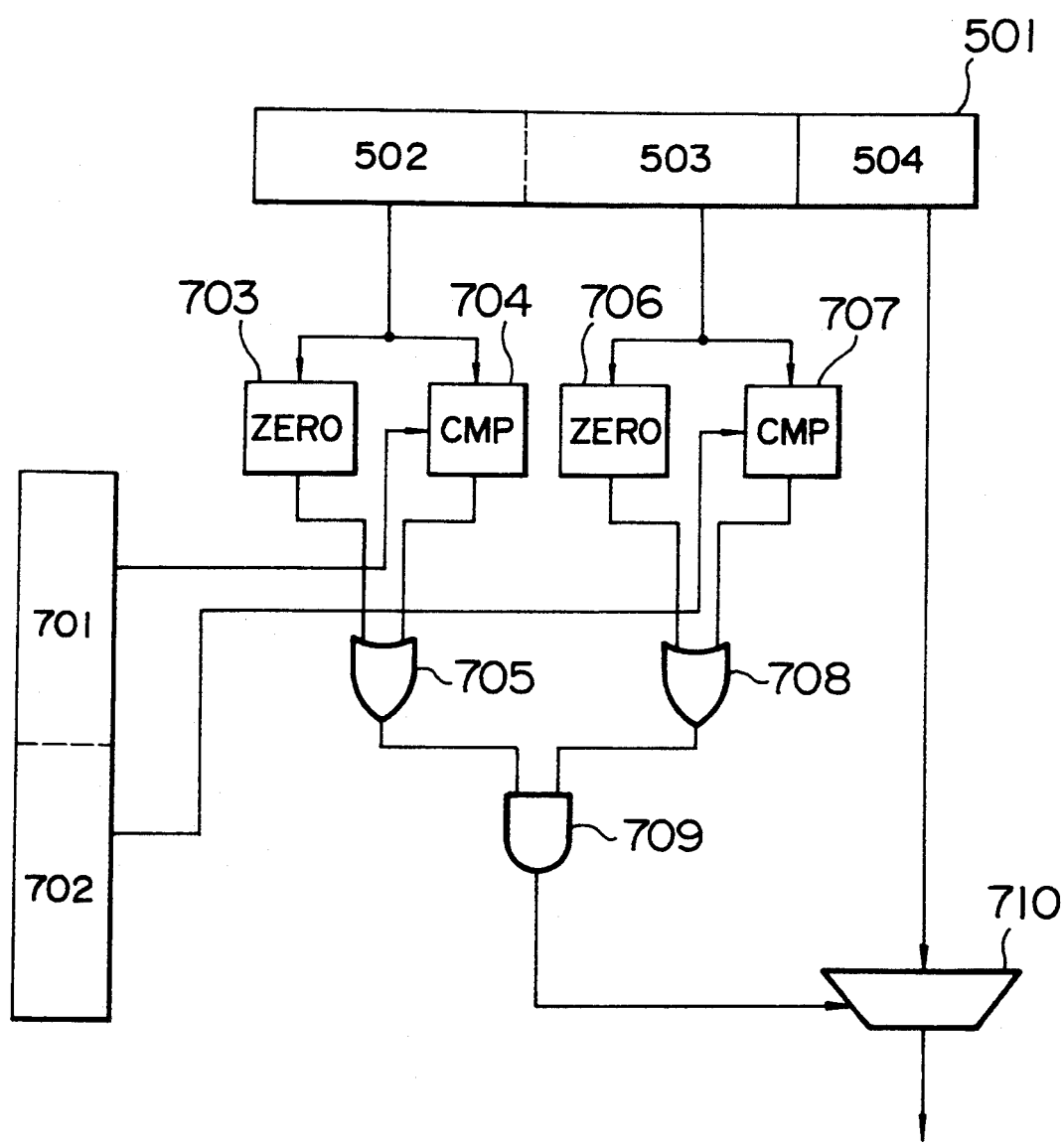
FIG. 6 is a view showing in a block diagram a circuit arrangement incorporated in a co-processor for discriminatively identifying a two-dimensional PE numbers in the multi-processor system shown in FIG. 1.

The communication between the host processor (CPU) and the co-processors (PEs) in the manner described above in conjunction with FIGS. 5A and 5B can be realized by providing each of the co-processors with a circuit of such a configuration as shown in FIG. 6 or by resorting to software employing a microprogram capable of executing the corresponding processing procedures.

Referring to FIG. 6, a reference numeral 501 indicates a receive register, 701 and 702 denote reference registers for storing data to be referenced upon comparison, 704 and 707 denote comparators, 703 and 706 denote zero detection circuits, 710 denotes an input unit, 709 denotes an AND gate, and numerals 705 and 708 denote OR gates, respectively.

Information 502, 503 and 504 (representative of the row number, column number and the command in this order) transmitted from the host processor is discriminatively decided by the aforementioned circuit whether that information is destined for the associated co-processor. More specifically, in each of the co-processors, it is discriminated whether the row number (the number in the x-direction) 502 and the column number (the number in the y-direction) 503 are zero, respectively, by means of the zero detection circuits 703 and 706 or whether or not the row number 502 and the column number 503 coincide with the allocated two-dimensional PE numbers stored in the reference registers 701 and 702 by means of comparators 704 and 707, respectively. The result of decisions made by the zero detection circuit 703 and the comparator 704 are logically ORed by the OR gate 705. In this manner, when the row number 502 is zero or coincides with the allocated row number stored in the register 701, a coincidence signal is produced. Similarly, when the column number 503 is zero or coincides with the number stored in the register 702, a coincidence signal is produced. Both the coincidence signals are then logically ANDed by the AND gate 709, whereby the two-dimensional PE number designating a row and a column is discriminatively determined. On the basis of the content of coincidence signal outputted by the AND gate 709, it is decided whether the command 504 issued by the host processor (CPU) is to be accepted or not through the input unit 710.

Figure 7:
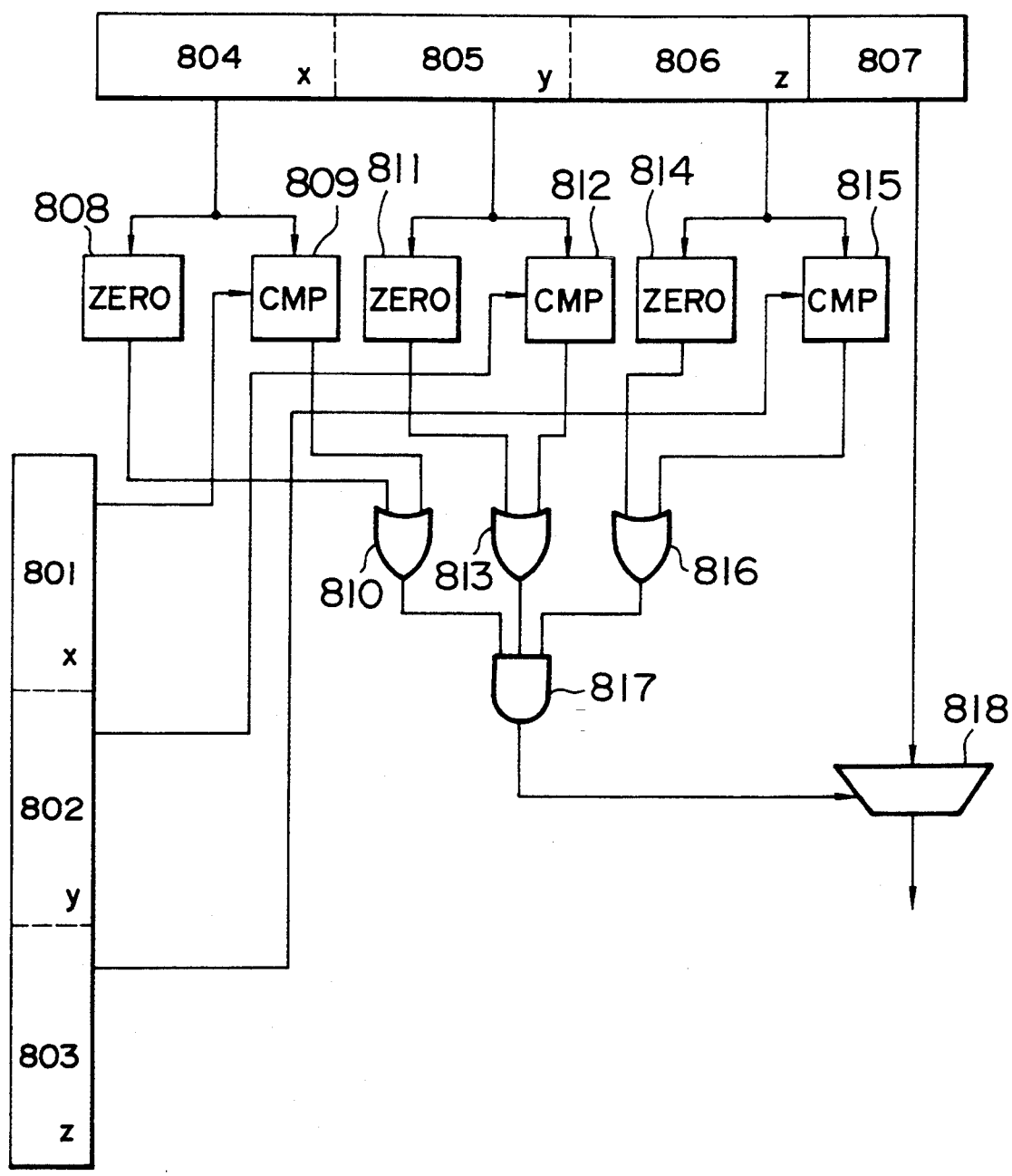
FIG. 7 is a view showing in a block diagram a circuit arrangement incorporated in a co-processor for discriminating three-dimensional PE numbers in the system shown in FIG. 1.

FIG. 7 is a view illustrating the procedure for discriminatively identifying the PE number in the case of the three-dimensional data processing according to another embodiment of the present invention. As will be readily understood, in the case of the three-dimensional data processing, the co-processors constituting the multi-processor system shown in FIG. 1 are arrayed three-dimensionally, wherein the individual co-processors or PEs are allocated with three-dimensional PE numbers generally given by (x, y, z) for designation thereof, respectively, wherein one of these three-dimensional numbers is utilized for the global communication. For example, the global communication can be realized when the one number is zero, as in the case of the two-dimensional PE numbers.

Referring to FIG. 7, the three-dimensional PE numbers 804, 805 and 806 transmitted from the host processor are compared with the numbers 801, 802 and 803 placed in the respective registers by means of the comparators 809, 812 and 815. Additionally, decision is made whether the PE numbers 804, 805 and 806 are zero or not by means of the zero detection circuits 808, 811 and 814, respectively. The outputs of the zero detection circuits and the comparators are logically ORed by OR gates 810, 813 and 816. The outputs of these OR gates is then logically ANDed by an AND gate 817, wherein decision is made as to whether the accompanying command 807 is to be inputted or not in accordance with the output of the AND gate 817.

As will be appreciated from the above description, by employing the three-dimensional PE numbers, the host processor can communicate with a particular one of the co-processors in case the three-dimensional numbers (x, y, z) are imparted with others values than zero, or communicated simultaneously with all the co-processors disposed along one axis by setting the corresponding one of the three-dimensional PE numbers (x, y, z) to zero, or communicate simultaneously with all the co-processors arrayed in a plane by setting two of the three-dimensional numbers (x, y, z) to zeros or with all the co-processor in the system by setting all the three-dimensional numbers (x, y, z) to zeros.

Figure 8A:
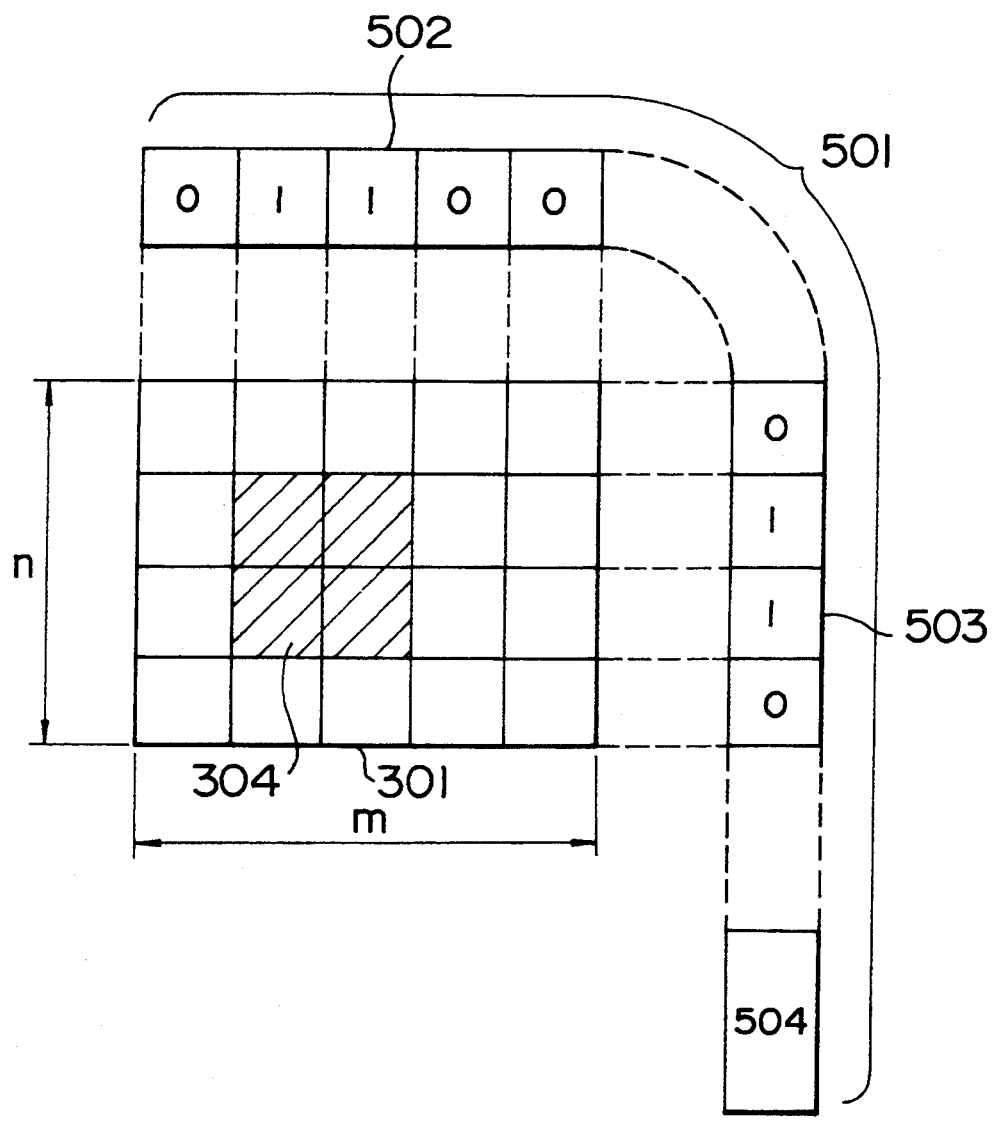
FIGS. 8A to 8C are Views for illustrating operations of the multi-processor system according to a second exemplary embodiment of the present invention.
Figure 8B:
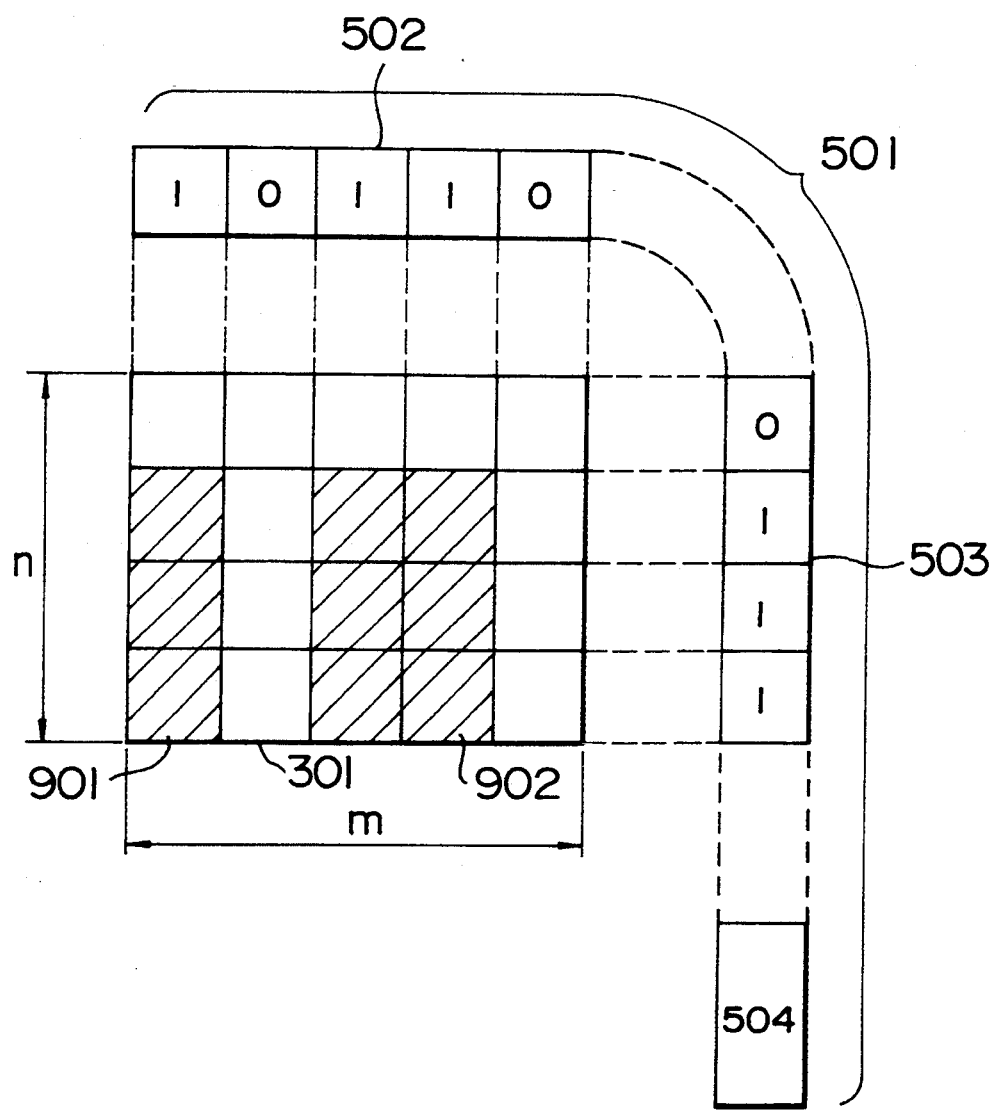
Figure 8C:
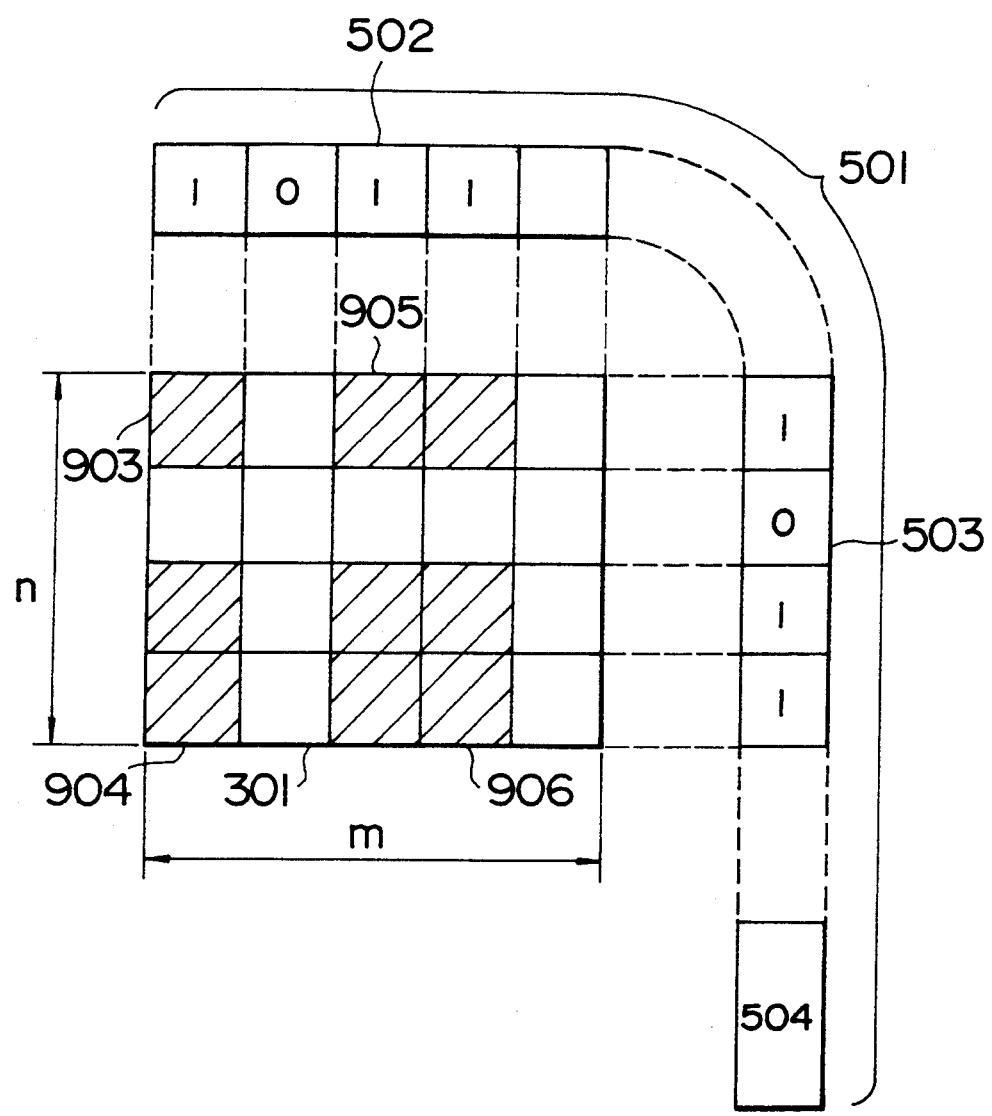

FIGS. 8A, 8B and 8C are views for illustrating the multi-processor system according to another embodiment of the present invention in which a bit-map system is adopted for the allocation of the PE numbers.

It is assumed that two-dimensional PE numbers are allocated to the co-processors disposed in an array of m×n. According to the PE number allocation based on the bit map principle, the rowwise (x-directional) PE number 502 and the columnwise (y-directional) PE number 503 which are combined or paired with a command 504 to thereby form a whole information format 501 are allotted with bit widths of m bits and n bits, respectively. Although such bit allotment requires additional bits for designating the row (x-direction) and the column (y-direction), it provides a practically high utility in that the selection or non-selection of the co-processor(s) for command reception can be determined in an arbitrary manner. More specifically, referring to FIGS. 8A, 8B and 8C, the a-th bit in the region or field 502 of m-bit width representative of the rowwise PE number (where $1 \leq a \leq m$) may be imparted with a logical value "0" or "1" for determining the non-selection or selection of the a-th row. Similarly, the b-th bit in the region 503 of n-bit width indicative of the columnwise PE number (where $1 \leq b \leq n$) is imparted with logical value "0" or "1" for determining non-selection or selection of the b-th column. Thus, only the co-processor (PE) for which both the row and the column are selected is enabled to perform communication with the host processor (cPu).

Figure 3B:
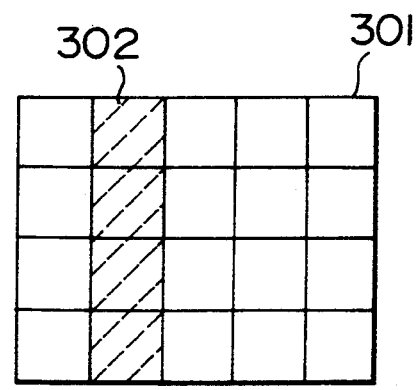
Figure 3C:
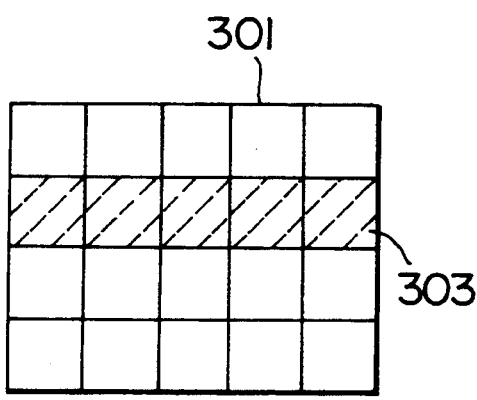
Figure 3D:
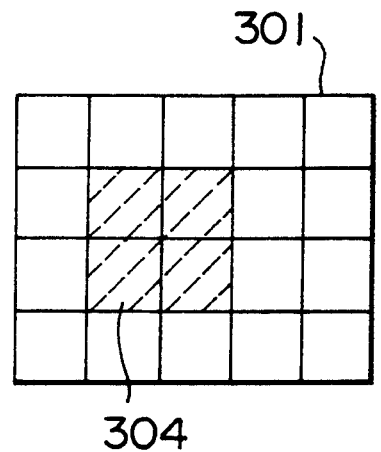

By adopting the co-processor control system described above, not only the data processing illustrated in FIGS. 3B, 3C and 3D but also the data processing for such combined sub-region blocks as illustrated in FIGS. 8A, 8B and 8C can be executed in a much facilitated manner. Parenthetically, the data processing mode shown in FIG. 8A corresponds to the one shown in FIG. 3D, while FIG. 8B shows the data processing in the form of combination of two separated sub-region blocks, and 8C shows the data processing in the form of combination of four separated sub-region blocks.

Figure 9:
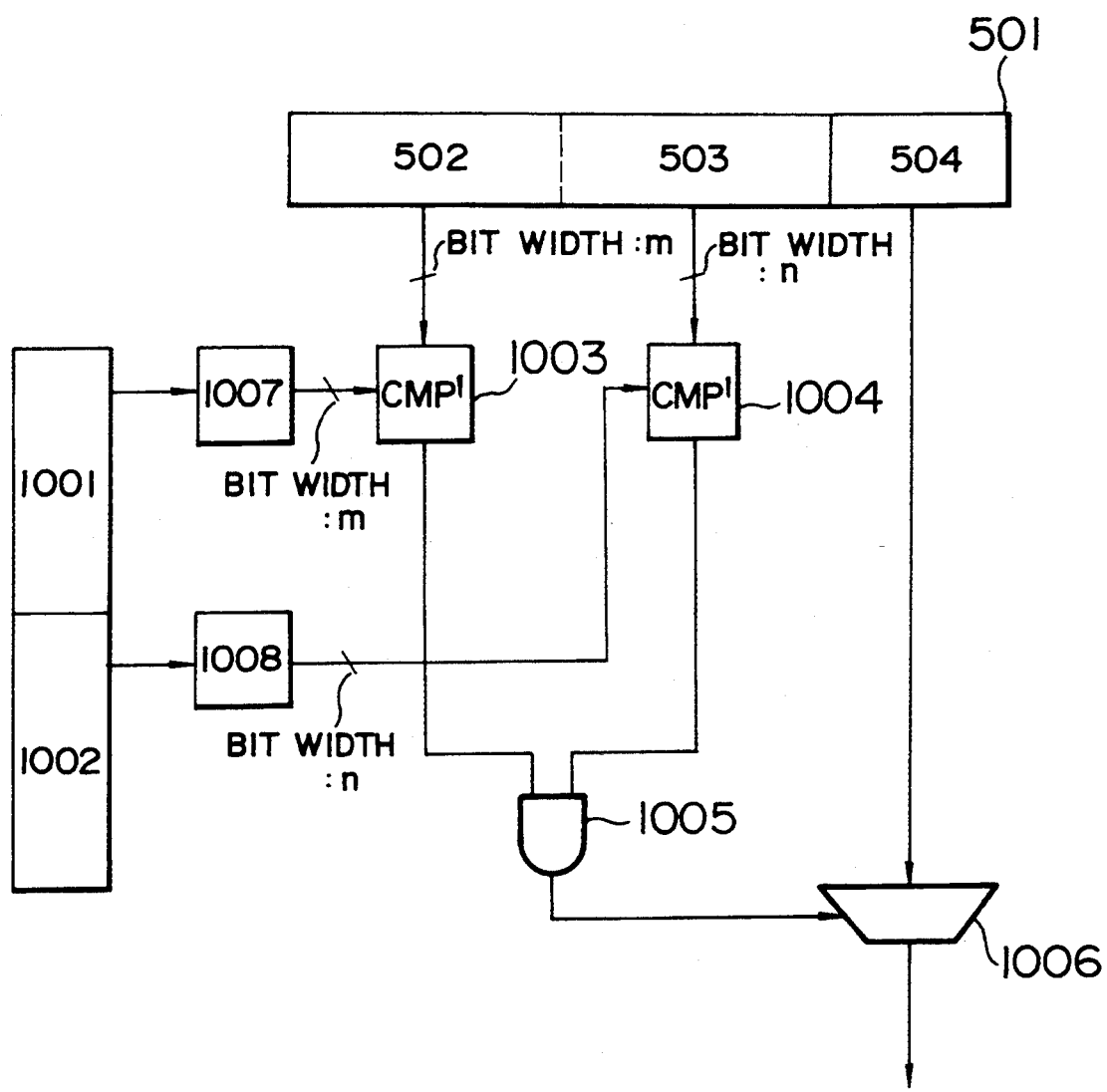
FIG. 9 is a view showing in a block diagram a circuit arrangement employed in the system shown in FIGS. 8A to 8C for discriminating the PE numbers.

FIG. 9 is a block diagram showing a PE number discriminating circuit for discriminatively designating the individual co-processors shown in FIGS. 8A, 8B and 8C.

For realizing the communication between the host processor (CPU) and the co-processors in the manners illustrated in FIGS. 8A, 8B and 8C, it is required to provide the circuit shown in FIG. 9 for each of the co-processors or alternatively to provide software which allows the processing procedures performed by the circuit shown in FIG. 9 to be executed with the aid of a microprogram or the like.

Now referring to FIG. 9, information 502, 503 and 504 issued by the host processor indicating the row (x) designation number, the column (y) designation number and the command, respectively, is discriminated by the PE number discriminating circuit incorporated in each of the co-processors as to whether the information is destined for the associated co-processor. More specifically, in the PE number discriminating circuit, decoded output signals 1007 and 1008 resulting from the decoding of two-dimensional PE numbers 1001 and 1002 allocated to the associated co-processor are compared with the PE numbers issued by the host processor in respect to the bit pattern through the comparison blocks 1003 and 1004, respectively. In that case, assuming that the co-processor (PE) designated by the coordinates a and b (where $1 \leq a \leq m$ and $1 \leq b \leq n$) in the array of m×n co-processors has values a and b of the two-dimensional PE numbers 1001 and 1002 allocated for its own self, then the decoded output signals 1007 and 1008 of the above-mentioned two dimensional PE numbers having m-bit width and n-bit width, respectively, have such bit patterns in which the logic value "1" is present only at the a-th bit in the region of m-bit width (i.e. in the decoded output signal 1007) and at the b-th bit in the region of n-bit width (i.e. in the decoded output signal 1008), respectively, with all the remaining bits being of logic "0s".

The bit patterns of the decoded output signals 1007 and 1008 are found to coincide with the bit patterns of the PE designation numbers transmitted from the host processor through the comparison blocks 1003 and 1004, respectively. The outputs from the comparison blocks 1003 and 1004 are logically ANDed by an AND gate 1005 of which output is then used for controlling the input unit 1006 for allowing the command 504 to be inputted to the associated co-processor.

Figure 10:
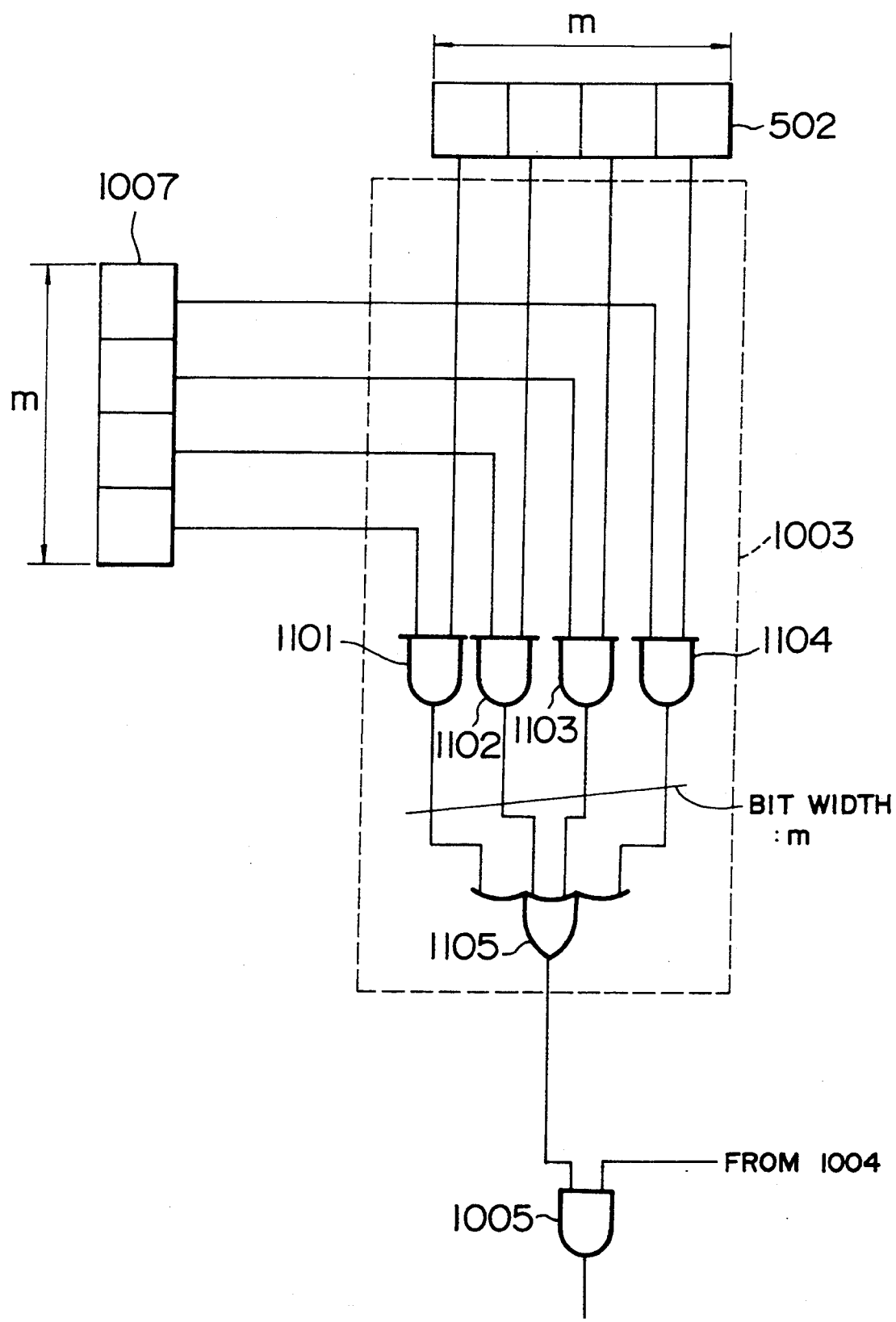
FIG. 10 is a view showing a circuit configuration of a bit pattern comparing block shown in FIG. 9.

FIG. 10 shows a circuit configuration of the bit pattern comparison block 1003 shown in FIG. 9, by way of example. As will be seen in FIG. 10, logic AND gates 1101 to 1104 are provided in a number corresponding to the bit number m for comparing the bit pattern of information 502 incoming from the host processor with that of the output signal of the decoder 1007, wherein the outputs of m AND gates are applied to m inputs of a logic OR circuit 1105 whose output constitutes the output signal of the bit pattern comparison block 1003. On the assumption that the output signal of the decoder 1007 has the logical value "1" only at the a-th bit with all the other bits being of logic "0s", the output signal of the bit pattern comparison block 1003 assumes the logical value "1" when the information 502 transmitted from the host processor has logical value "1" at the a-th bit. On the other hand, when the information 502 from the host processor has logical value "0" at the a-th bit, the output of the bit pattern comparison block 1003 is logic "0".

It will be appreciated that the bit pattern comparison block 1004 for the columnwise (y) PE designation number performs same comparison operation as described above for the output signal of the decoder 1008 and the information 503 incoming from the host processor.

The output signals of both the bit pattern comparison blocks 103 and 104 are logically ANDed by an AND gate 1005, whereby the two dimensional PE numbers in the rowwise (x) and columnwise (y) directions can be discriminated. The coincidence signal outputted from the above-mentioned AND gate 1005 is utilized for controlling the command input block 1006 to allow the associated co-processor to receive the command 504 from the host processor.

It should be mentioned here that in the case of the embodiment under consideration, the global PE selection pattern for all the co-processors (PEs) is decided to be validated when all the bits of both information 502 and 503 are logic "1s". This decision can be realized without need for providing any dedicated hardware or software.

In the foregoing description made with reference to FIGS. 8 to 10, it has been assumed that the allocation of the two-dimensional PE numbers is realized on the basis of the bit map principle. It should however be understood that allocation of more than three-dimensional PE numbers can equally be realized with the aid of the bit map schema.

Further, by adopting the bit map schema in allocation of the PE numbers, numerous and various types of data processings such as partial image processing, combinations of partial image processings and others as exemplified in FIGS. 8A, 8B and 8C can be carried out in a facilitated manner at a high speed, which processings are however impossible with the multi-processor system shown in FIG. 1.

Figure 11:
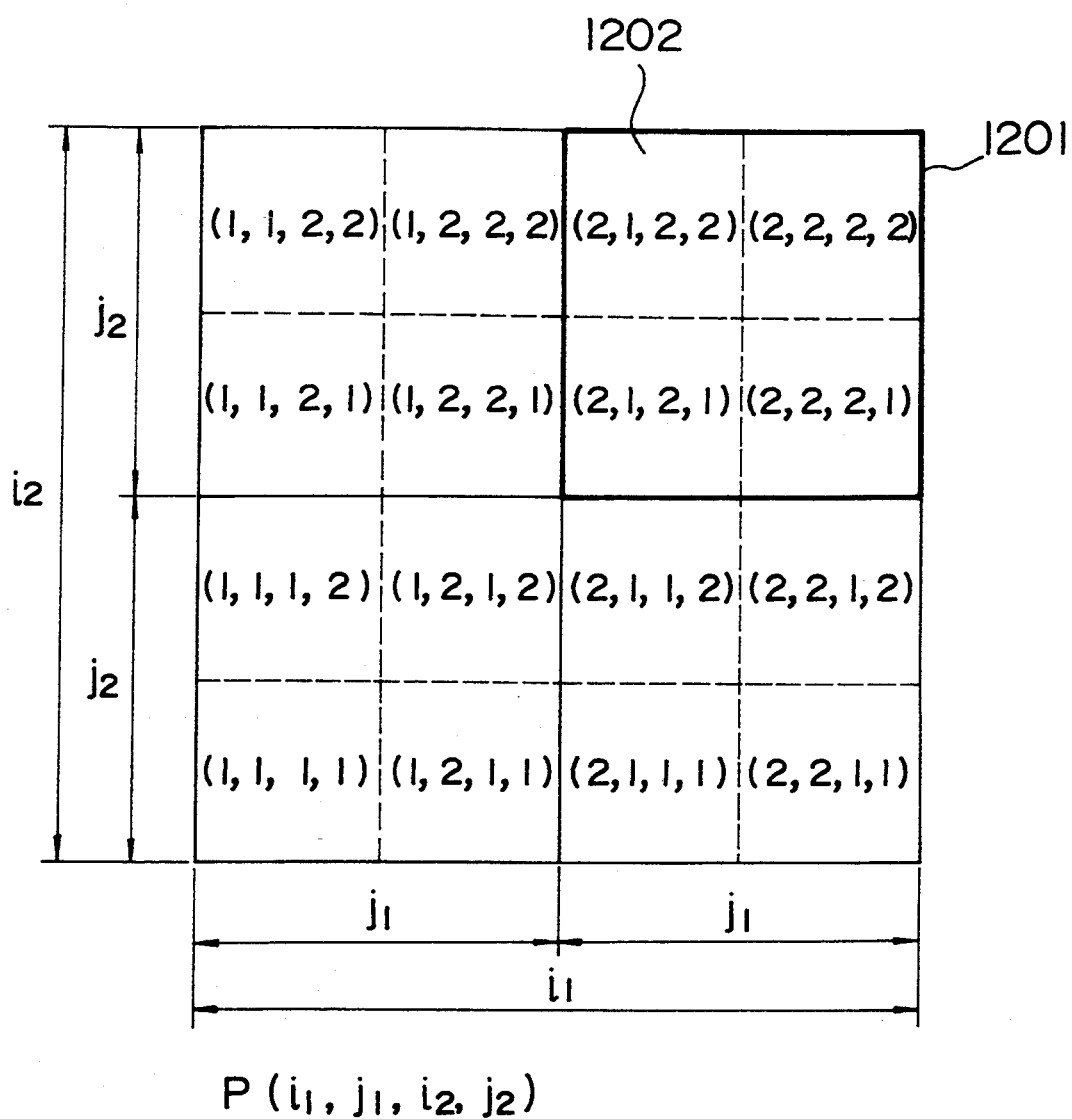
FIG. 11 is a view for illustrating a multi-dimensional PE number allocation schema according to a third exemplary embodiment of the present invention.

FIGS. 11 et seq. are views for illustrating a third embodiment of the present invention in which a vector-type PE number designation method is adopted. The following description is directed to application of the invention to a multi-dimensional array by making use of the vector-type PE number designation.

In the case of k dimensions, the vector-type PE number designation can be expressed by $P(i_1, i_2, \ldots, i_k)$. In the system illustrated in FIG. 1, it was assumed that $k=1$ and $1 \leq i_1, i_2 \leq 8$. In the case of the multiple dimensions given by a general expression of $P\{i_1(j_1, j_2, \ldots, j_1), i_2(j_1, j_2, \ldots, j_l), \ldots, i_k(j_1, j_2, \ldots, j_l)\}$, each of the k dimensions can further be expressed by l dimensions where $1 \leq j \leq l$. For simplification, the above expression is rewritten in the form of $P(i_1, j_1, j_2, \ldots, j_l, i_2, j_1, j_2, \ldots, j_l, \ldots i_{k-1}, j_1, j_2, \ldots, j_l)$.

In the case of the illustrative embodiment of the vector-type PE number designation shown in FIG. 11, it is assumed that $k=2$ and $l=2$. As will be seen, the sixteen co-processors are each assigned with a designation number generally given by $$P(i_1, j_1, i_2, j_2)$$

More specifically, in the case of the exemplary system shown in FIG. 11, four divisions or groups 1201 indicated as enclosed by solid lines (each including four co-processors or PEs) are assigned with the designation numbers $i_1$ and $i_2$, wherein the four co-processors or PEs 202 within each division or group are attached with the numbers $j_1$ and $j_2$. Further, the numerical value of zero is assumed to indicate the global communication. With this arrangement, communication between the co-processors (PEs) and the host processor (CPU) can be realized in various forms as illustrated in FIGS. 12A to 12E.

Figure 12A:
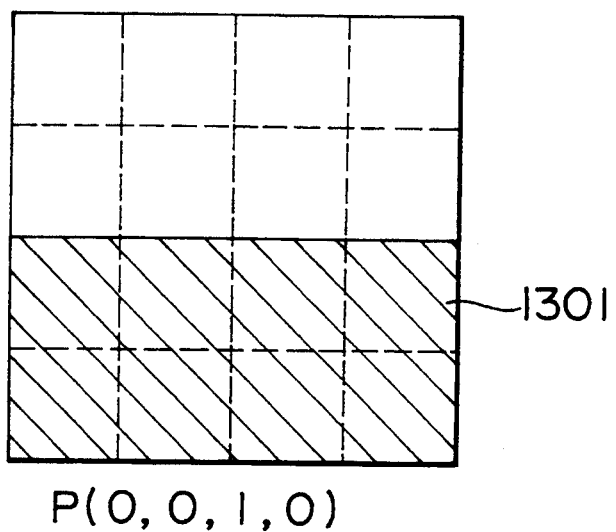
FIGS. 12A to 12E are views for illustrating arrays of the co-processors (PEs) which can simultaneously communicate with the host processor on the assumption that the multi-dimensional PE number allocation or designation schema illustrated in FIG. 11 is adopted.

Referring to FIG. 12A, eight co-processors indicated by hatched area 1301 respond to the PE designation numbers $P(0, 0, 1, 0)$ transmitted from the host processor (CPU). Since $i_1$ and $i_2$ are of logic "0" and "1", respectively, in $P(i_1, j_1, i_2, j_2)$, the co-processors or PEs in all groups are designated in the x-direction while the co-processors of the first group is designated in the y-direction. Additionally, since $j_1 = "0"$ and $j_2 = "0"$ the co-processors covered by the hatched area 301 are ultimately designated.

Figure 12B:
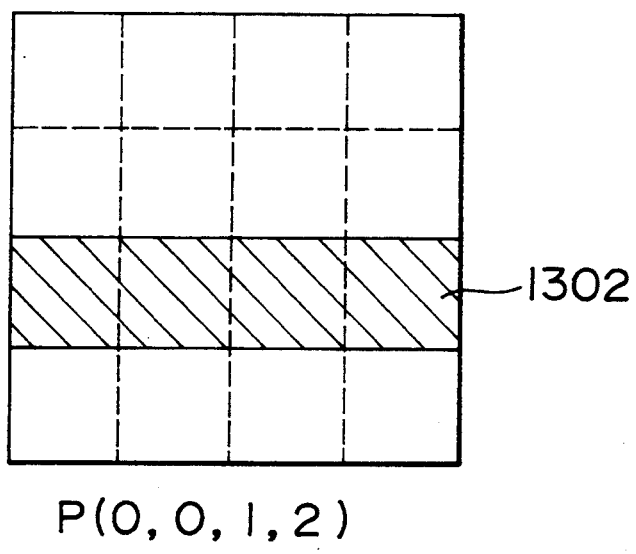

In the example illustrated in FIG. 12B, there are shown those co-processors (PEs) which respond to the PE numbers given by $P(0, 0, 1, 0)$ and transmitted from the host processor (CPU). As will be seen, four co-processors disposed on a row (in the x-direction) respond to the PE numbers as indicated by a hatched area.

Figure 12C:
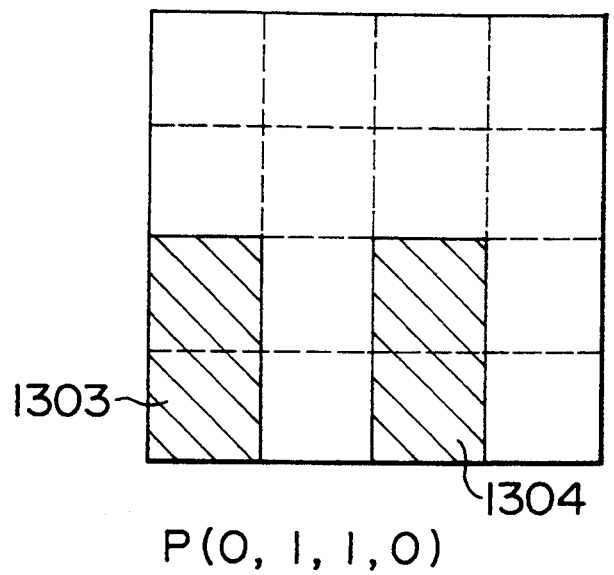

In the case of the example shown in FIG. 12C, four co-processors which respond to the PE numbers given by $p(0, 1, 1, 0)$ and transmitted from the host processor are indicated by hatched areas 1303 and 1304.

Figure 12D:
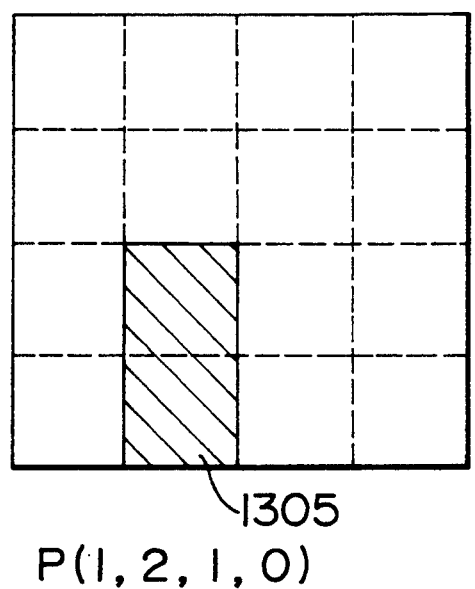

In FIG. 12D, two co-processors which respond to the PE numbers given by $P(1, 2, 1, 0)$ and issued by the host computer are indicated by a hatched area 1305.

Figure 12E:
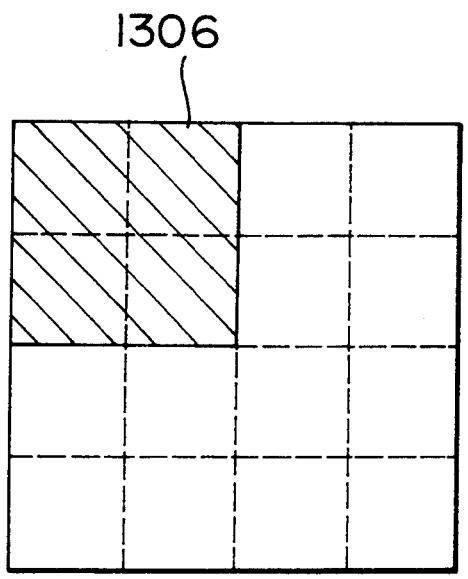

Finally in FIG. 12E, four co-processors making response to the PE designation numbers given by $P(1, 0, 2, 0)$ are indicated by a hatched area 1306.

Although there are illustrated five typical communication modes between the host processor and the co-processors in FIGS. 12A to 12E, it will be readily understood that the communication between the host processor and one co-processor can be performed by setting $i_1$, $j_1$, $i_2$ and $j_2$ to values not equal to zero. Similarly, simultaneous communication between the host processor and the co-processors can be realized by setting all values of $i_1$, $j_1$, $i_2$ and $j_2$ to zero.

Also in the embodiment described above in conjunction with FIGS. 11 and 12A to 12E, the information transfer for communication is performed in the form of the combined PE numbers and command, as with the case of the preceding embodiments.

Besides, discrimination of the PE designation numbers can of course be realized in the same manner as in the case of the embodiments described hereinbefore.

As will be appreciated from the above description, the system arrangement shown in FIG. 11 allows the communication between the host processor and a plurality of separate groups each including a number of co-processors (as illustrated in FIGS. 12A to 12E). This mode of communication is however impossible with the multi-processor system shown in FIG. 1.

Figure 13:
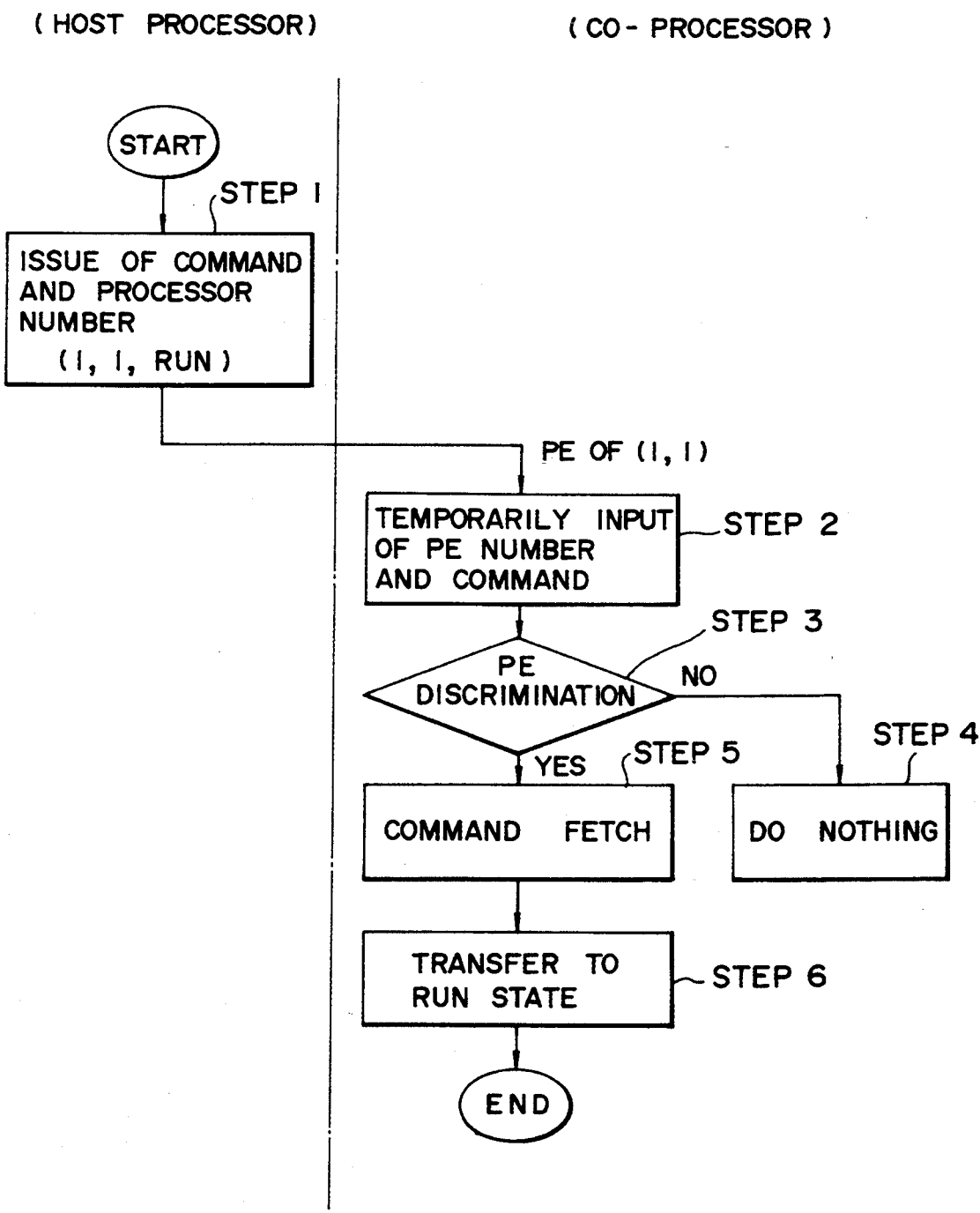
FIG. 13 is a view for illustrating a signal flow in communication interface between the host processor and the co-processors.

FIG. 13 is a flow chart for illustrating signal flows in communication interface between the host processor and the co-processors. Referring to the figure, the host processor (CPU) issues a command and the co-processor designation numbers (PE numbers) combined in a pair at a step 1. By way of example, let's assume that the information (1, 1; RUN) is issued on a common bus. Then, a program runs on the co-processor or PE disposed at the first location in both the rowwise (x) and columnwise (y) directions. More specifically, the co-processor identified by the PE numbers (1, 1) stores temporarily the PE numbers and the command at a step 2. Subsequently, the coprocessor of concern makes discriminating decision on the PE numbers at a step 3. When the result of the decision step is negative (NO), the co-processor does nothing (step 4). Only when the decision step 3 results in "YES", the processor fetches the command (step 5). Subsequently, the content of the command is executed, i.e. the coprocessor of concern assumes the state "RUN" (step 6).

Figure 14A:
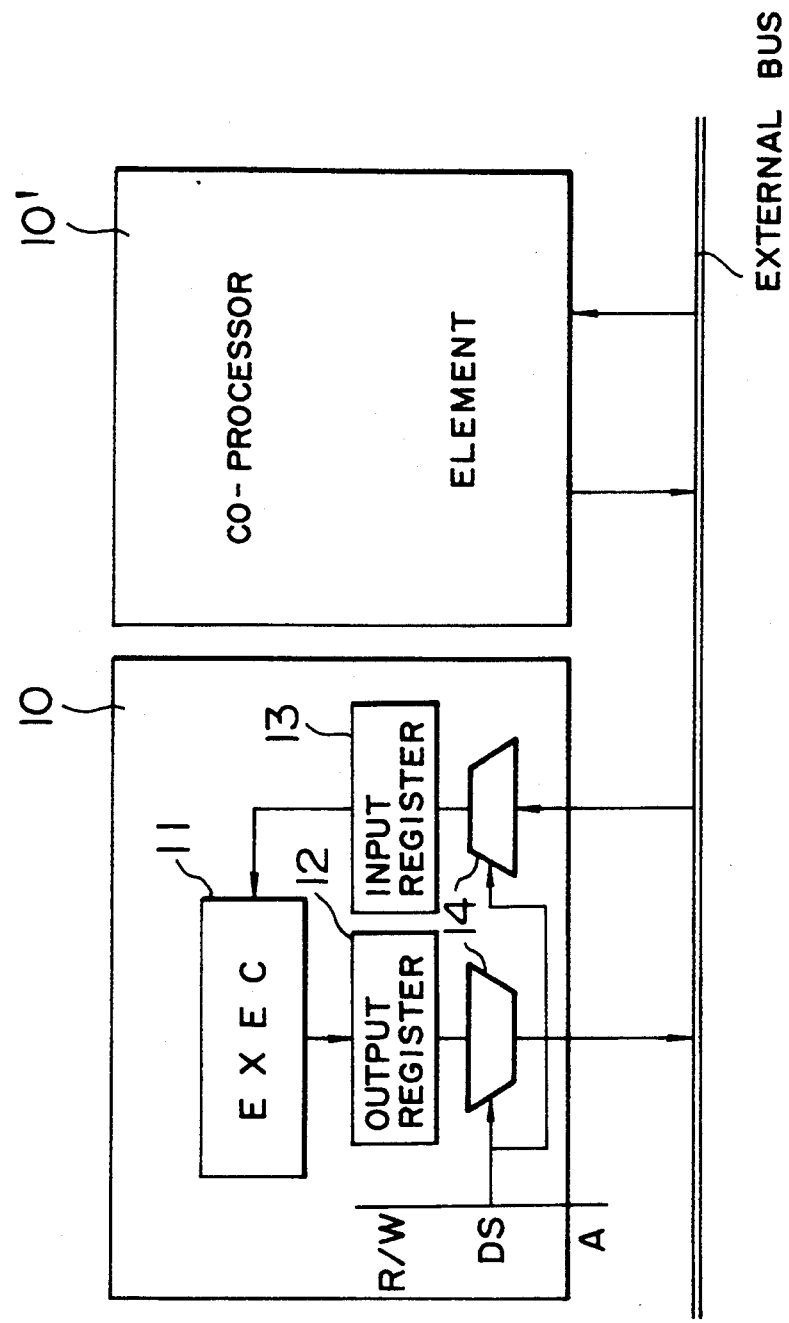
FIGS. 14A to 14C are views for illustrating operations of the co-processors in input and output modes.
Figure 14B:
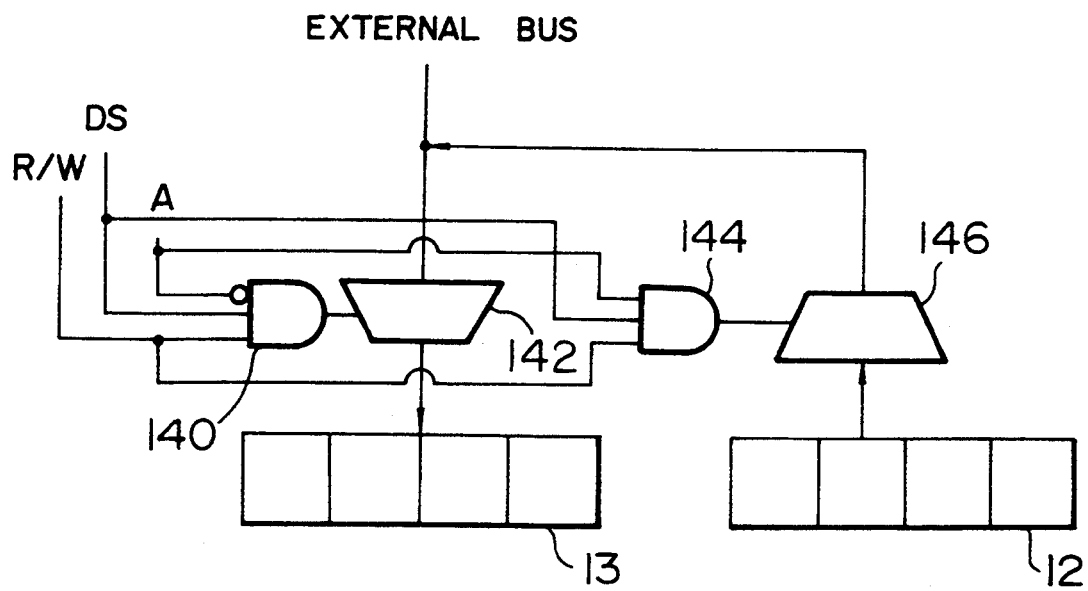

FIGS. 14A and 14B are views for illustrating address and command fetching operation performed by an input controller in the co-processor of the system shown in FIG. 1. Each of the co-processors 10 and 10' responds to a data strobe signal DS, an address signal A and a read/write signal R/W supplied externally to the input-/output controller 14 for transferring output data from an output register 12 onto an external bus, while an input register 13 fetches the input data supplied externally. A reference numeral 11 denotes a command execution unit. FIG. 14B shows in more detail a structure of the input/output controller 14. As will be seen, when the data strobe signal, the read/write signal R/W and the address signal A are supplied to an output gate 146 or an input gate 142 by way of an AND gate 144 or an AND gate 140, data is placed in the input register 13 or the data of the output register 12 is transferred onto the common external bus.

Figure 14C:
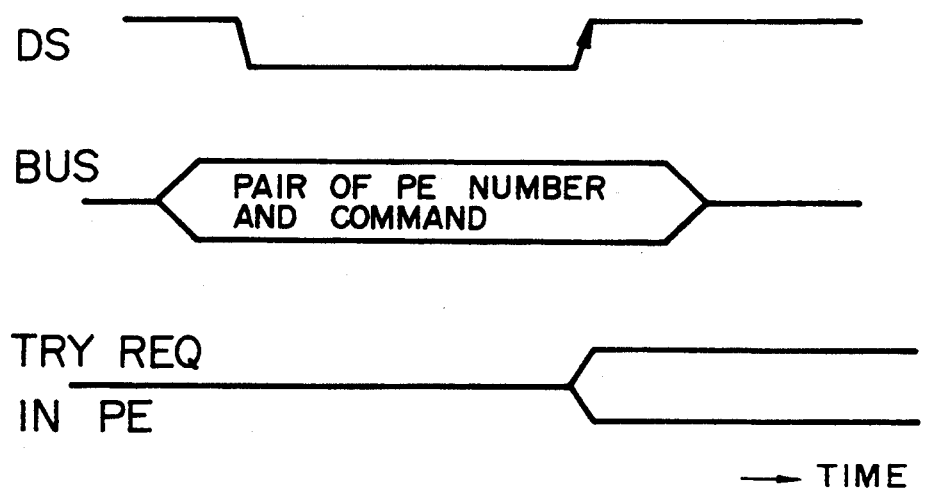

FIG. 14C shows in a timing chart the signals mentioned above. When the data including PE numbers and a command combined in a pair is issued by the host processor on the common external bus, the data strobe signal DS assumes a low level. Subsequently, at the time point the data strobe signal DS changes from the low level to a high level, the data on the common bus is fetched by the coprocessor to be loaded in the temporary register incorporated therein. In this manner, the host processor can communicate with the designated co-processor(s) with high efficiency to assign the appropriate data processing thereto.

When mutually comparing the first, second and third embodiments shown in FIGS. 1, 8 and 11, respectively, the systems shown in FIGS. 8, 11 and 1 are preferred in this order in respect to the variety of communications allowable between the host processor and the co-processors. However, for a same amount of information to designate the PE number required for the communication (i.e. the number of bits required for designation of the PE number), the systems shown in FIGS. 1, 11 and 8 are preferred in this order in respect to the number of the co-processors (PEs) with which the host processor is allowed to communicate.

Preparation of the PE numbers for every coprocessor can be accomplished by dedicated hardware provided externally of each co-processor. It should however be understood that such arrangement can also be adopted in which the individual co-processors issue the requests for establishing the respective PE numbers, wherein the host processor responds to the request by preparing the logical PE numbers sequentially starting from the co-processor located physically at one end. The latter method is advantageous in that alteration of the PE number is facilitated.

As will be appreciated from the foregoing description, the multi-processor system according to the present invention which is featured by allocation of the multi-dimensional PE numbers to a plurality of co-processors by the host processor brings about the advantages typified as follows:

(a) By utilizing a particular numerical value of the PE number for realizing the global communication, simultaneous communication of the host processor with a plurality of co-processor can be realized.

(b) In case the co-processors are disposed in the two-dimensional array, the host computer can selectively communicate with a particular one co-processor, or a number of co-processors located on a row or a column, or all the co-processor in the system or a group of co-processors located within a particular rectangular region or regions.

(c) By providing a plurality of PE number modes, it is possible to handle the co-processors as a two-dimensional array or one-dimensional array without need for any alteration of physical connection.

What is claimed is:

1. A multidimensional multi-processor system, comprising:
    a plurality of co-processors; and
    a host processor connected to said co-processors through a bus for supplying multi-bit information, having a multi-dimensional processor number which at least includes a x-direction number and a y-direction number and a command, to said co-processors through said bus, said x-direction number, y-direction number and said command being respectively disposed in a first field portion, in a second field portion and in a third field portion of said multi-bit information supplied by said host processor;
    wherein each of said co-processors includes
    (a) first means for storing multi-dimensional information which includes at least x-direction information and y-direction information inherent to the co-processor,
    (b) second means for determining a relationship between said multi-dimensional information stored in said first means and a multi-dimensional processor number supplied by said host processor,
    (c) third means for responding to said second means when said relationship is found to be a predetermined one, to thereby cause said co-processor to respond to said command, wherein said x-direction number corresponds to said x-direction information and said y-direction number corresponds to said y-direction information, respectively, when said relationship is said predetermined one,
    (d) fourth means for determining whether said x-direction number supplied by said host processor is a first particular number which allows simultaneous communication between said host processor and co-processors in a row direction of a matrix of said plurality of said co-processors,
    (e) fifth means for determining whether said y-direction number supplied by said host processor is a second particular number which allows simultaneous communication between said host processor and co-processors in a column direction of said matrix of said plurality of said co-processors, and
    wherein said third means further responds to at least either one of said fourth means and fifth means when said x-direction number supplied by said host processor is said first particular number or said y-direction number supplied by said host processor is said second particular number so as to thereby cause said associated co-processor to respond to said command.

2. A multi-processor System according to claim 1, wherein each of said co-processors further includes:
(f) sixth means for storing said multi-dimensional processor number and said command supplied from said host processor through said bus.

3. A multi-processor system according to claim 1, wherein said first particular number and said second particular number are zero.

4. A co-processor for use in a multidimensional multi-processor system which includes a host processor connected to said co-processor and to other co-processors through a bus, wherein said host processor issues multi-bit information having a multi-dimensional processor number which at least includes a x-direction number and a y-direction number and a command, on said bus, said x-direction number, said y-direction number and said command being respectively disposed in a first field portion, in a second field portion and in a third field portion of said multi-bit information issued from said host processor; and wherein each of said co-processors comprises:
(a) first means for storing multi-dimensional information which includes at least x-direction information and y-direction information inherent to said co-processor;
(b) second means for determining a relationship between said multi-dimensional information stored in said first means and said multi-dimensional processor number supplied by said host processor;
(c) third means for responding to said second means when said relationship is found to be a predetermined one, to thereby cause said co-processor to respond to said command, wherein said x-direction number corresponds to said x-direction information and said y-direction number corresponds to said y-direction information, respectively, when said relationship is said predetermined one;
(d) fourth means for determining whether said x-direction number supplied by said host processor is a first particular number which allows simultaneous communication between said host processor and co-processors in a row direction of a matrix of said plurality of said co-processors;
(f) fifth means for determining whether said V-direction number supplied by said host processor is a second particular number which allows simultaneous communication between said host processor and co-processors in a column direction of said matrix of said plurality of said co-processors; and
wherein said third means further responds to at least either one of said fourth means and fifth means when said x-direction number supplied by said host processor is said first particular number or said y-direction number supplied by said host processor is said second particular number so as to thereby cause said associated co-processor to respond to said command.

5. A co-processor according to claim 4, further comprising:
(f) sixth means for storing said multidimensional processor number and said command supplied from said host processor through said bus.

6. A co-processor according to claim 4, wherein said first particular number and said second particular number are zero.

* * * * *